Dec. 7, 1965    W. ALTAR ETAL    3,221,695
TARGET LOCATION SYSTEM
Filed April 27, 1956    3 Sheets-Sheet 1

INVENTORS
WILLIAM ALTAR
CARL W. HELSTROM
BY
ATTORNEYS

INVENTORS
WILLIAM ALTAR
CARL W. HELSTROM
BY
ATTORNEYS

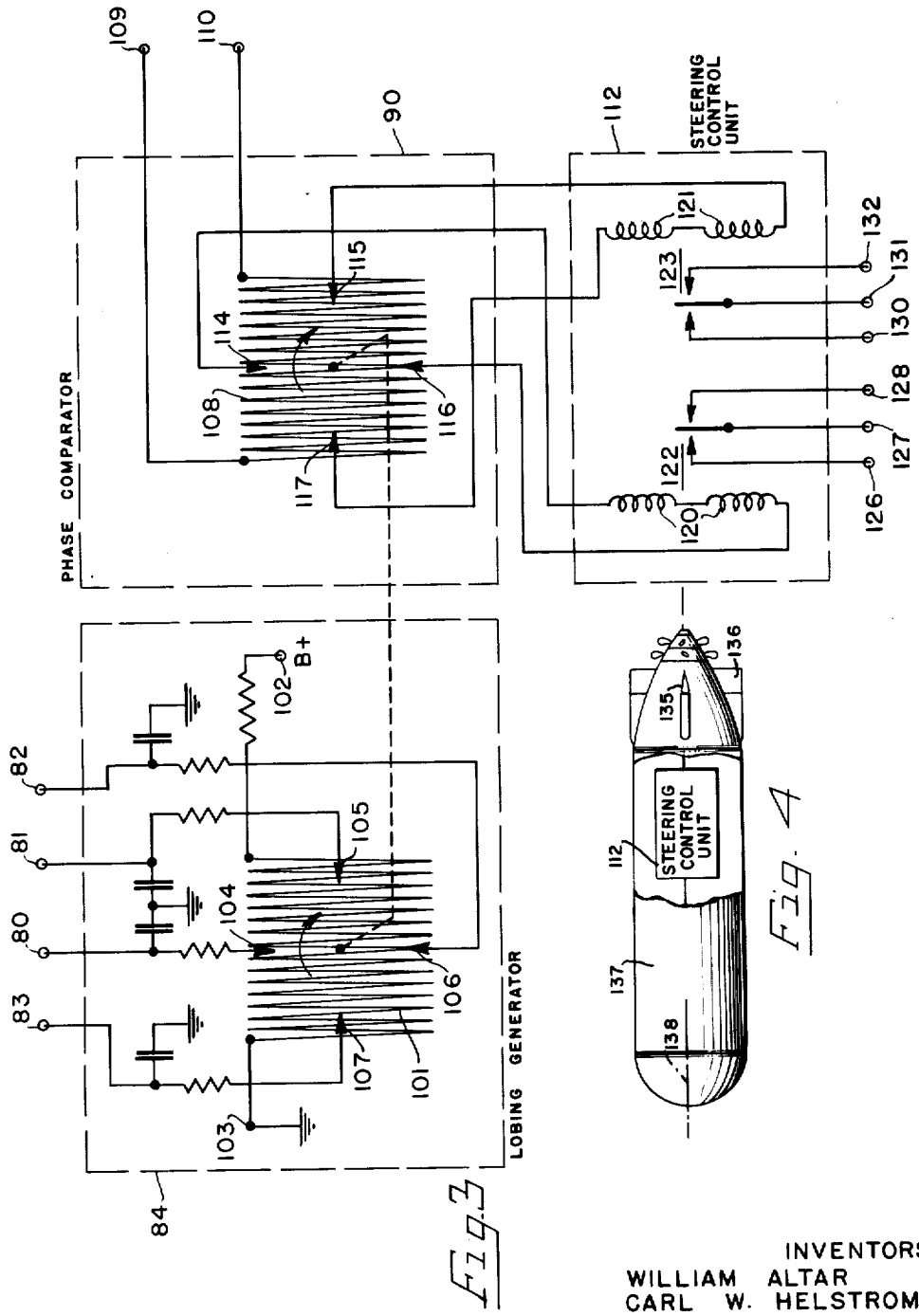

United States Patent Office 3,221,695
Patented Dec. 7, 1965

3,221,695
TARGET LOCATION SYSTEM
William Altar and Carl W. Helstrom, Pittsburgh, Pa., assignors, by mesne assignments, to the United States of America as represented by the Secretary of the Navy
Filed Apr. 27, 1956, Ser. No. 581,263
8 Claims. (Cl. 114—23)

This invention relates generally to target location systems and in particular to electro-acoustic underwater target location systems for acoustic homing torpedoes.

The present invention embodied in an acoustic homing torpedo as described herein is in certain respects similar and related to the "Continuous Wave Acoustic Guidance System" disclosed in a copending U.S. application, Serial No. 414,525, filed March 5, 1954 by William H. Hamilton and Arthur Nelkin and now Patent No. 3,180,296. A brief description of this continuous-wave acoustic guidance system as to salient components and features thereof will first be given, in order to provide a better understanding of the present invention and of the objects and advantages thereof. The said guidance system is employed in a torpedo which projects unmodulated CW (continuous-wave) ultrasonic energy in a search beam extending forwardly from the nose of the torpedo and having a generally conical configuration centered upon the torpedo's longitudinal axis. During its target search phase, the torpedo runs a course pre-selected to effect a sweeping search of a suspect region, presence of a target submarine therein being identified by reception of corresponding target echo signals of suitable magnitude. Target direction and torpedo steering control signals are derived from the relative phase characteristics of target echo signals as received and delivered by a four-quadrant electro-acoustic transducer carried in the nose of the torpedo. A phase-to-amplitude converter to which the resultant set of four target signals is applied yields a set of four signals composed of a so-called sum-signal and difference-signals (later defined). These latter signals, operated upon by a switching or "lobing" amplifier (later described) comprising four sections having gains which are continuously varied in accordance with phase-sequenced signals provided by a lobing generator, are converted and summed to yield a single AM (amplitude-modulated) signal having modulation-envelope phase and amplitude characteristics from which target direction signals can be derived in a form suitable for torpedo steering control. The necessary operations upon the AM signal, requisite to final derivation of the target's relative bearing and elevation signals, are performed in a single-channel circuit which includes rejection filters to discriminate and isolate the target components of the AM signal from leakthrough (cross-talk), surface and bottom echoes, reverberation, and from other such signals which are otherwise ordinarily so troublesome because of their interfering and masking effects, and for this purpose the rejection filters take advantage of the distinguishing Doppler frequency shift exhibited by echoes which arise from target submarines in motion. The single channel further comprises an amplifier, an AGC (automatic gain control) circuit, and a heterodyning "lock-up" circuit which in effect automatically searches for the AM target signal (which is unpredictable as to carrier frequency because of unknown velocity of the target relative to the torpedo). Upon "acquiring" or locking upon the AM target signal, the heterodyning lock-up circuit then effects continuous self-control to deliver a heterodyned target signal at a constant IF (intermediate-frequency), still carrying modulation at the lobing frequency. The single channel further includes a narrow-band filter, an IF amplifier, and a detector and driver circuit which delivers an amplified modulation signal carrying the target direction information as previously mentioned. This modulation signal is applied to a phase comparator which is referenced to the lobing signal generator, resulting in production of suitable relative bearing and elevation signals which are utilized to effect steering of the torpedo toward the submarine from which the target signals arise.

The Doppler type of active-acoustic homing system as above-described is in most instances preferable to the simple pulse-echo system for a number of reasons, among them the fact that it is amenable to the use of highly selective or narrow-band amplification which affords the distinct advantage of yielding significant improvement in signal-to-noise ratio, thereby increasing the target acquisition and homing range capabilities of the acoustic torpedo. It further provides discrimination against echoes arising from surface and bottom reflections which otherwise tend to decoy the torpedo, and this can be a very important attribute in many tactical situations where the torpedo must operate near the sea surface or sea bed, or in relatively shallow water, conditions which give rise to false echoes capable of defeating other types of active-acoustic homing systems. These advantages are of course also retained by the particular Doppler-type homing system to be described as an illustrative embodiment of the present invention.

As to implementation and equipment, an important advantage of the guidance system described in the above-mentioned copending application is that the single-channel technique requires only a single set of reverberation and leak-through filters. This is of considerable importance in certain applications where space-economy is desirable, for example in aircraft-launched homing torpedoes, for the narrow-band rejection filters are generally quite bulky and the use of a number of signal channels would ordinarily require a like number of sets of these rejection filters. The single-channel technique as above described, however, imposes undesirable restrictions upon the lobing frequency, complicates the AGC circuit, limits the amplification and filtering selectivities which can be employed, and exposes the automatic frequency control (in the lock-up circuit) to possible erratic action under circumstances in which the difference-signals include spurious noise components of abnormal amplitudes.

It is therefore a primary object of the present invention to provide an improved target detection and direction-finding system.

It is another object to provide a target location system having distinct unmodulated sum-signal and AM difference-signal channels which are linked to yield circuitry simplification and performance improvements.

It is a further object to provide an improved active-acoustic homing torpedo system.

In accordance with the present invention, an acoustic target detection and direction-finding system, similar in certain respects to that disclosed in the above-mentioned copending application, is provided with novel circuitry which makes feasible a higher switching or lobing frequency, enables greater sum-signal channel relectivity to be utilized with attendant improvement in target acquisition and homing range capabilities, eliminates the need for an automatic gain control circuit, and provides more stable automatic frequency control. Basically, this is accomplished by providing two separate circuit channels which isolate signal spectrum search and automatic tuning operations which employ the unmodulated sum-signal, from lobing operations which are performed only upon the difference-signals; by providing coherent heterodyning of the sum-signal and AM difference-signals in these two channels; and by combining the resultant heterodyned signals and deriving therefrom target-direction signals which in the described instance serve as steering signals for homing control of a torpedo. Further, the two channels are so organized and linked that the use of a single set of rejection filters and narrow-band amplification in one channel effects improvement in the signal-to-noise ratio of the system, without need for duplication of the bulky rejection filters and selective amplifiers as would ordinarily be required for a two-channel system.

Other objects and many of the attendant advantages of this invention will be readily appreciated as the same becomes better understood by reference to the following detailed description when considered in connection with the accompanying drawings wherein.

Figure 1:
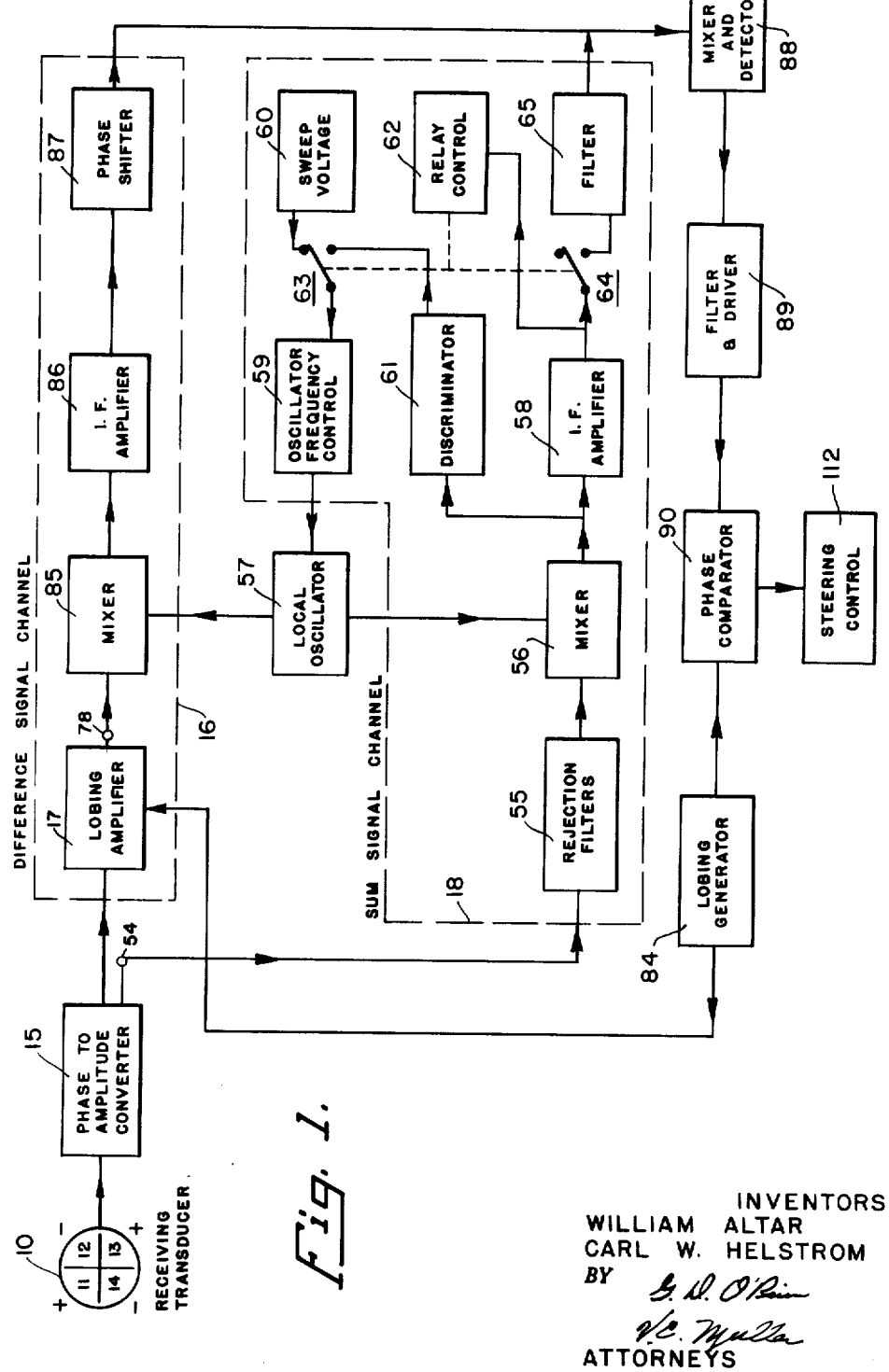
FIG. 1 illustrates in block diagram form a combination of circuit units in accordance with the present invention.
Figure 2:
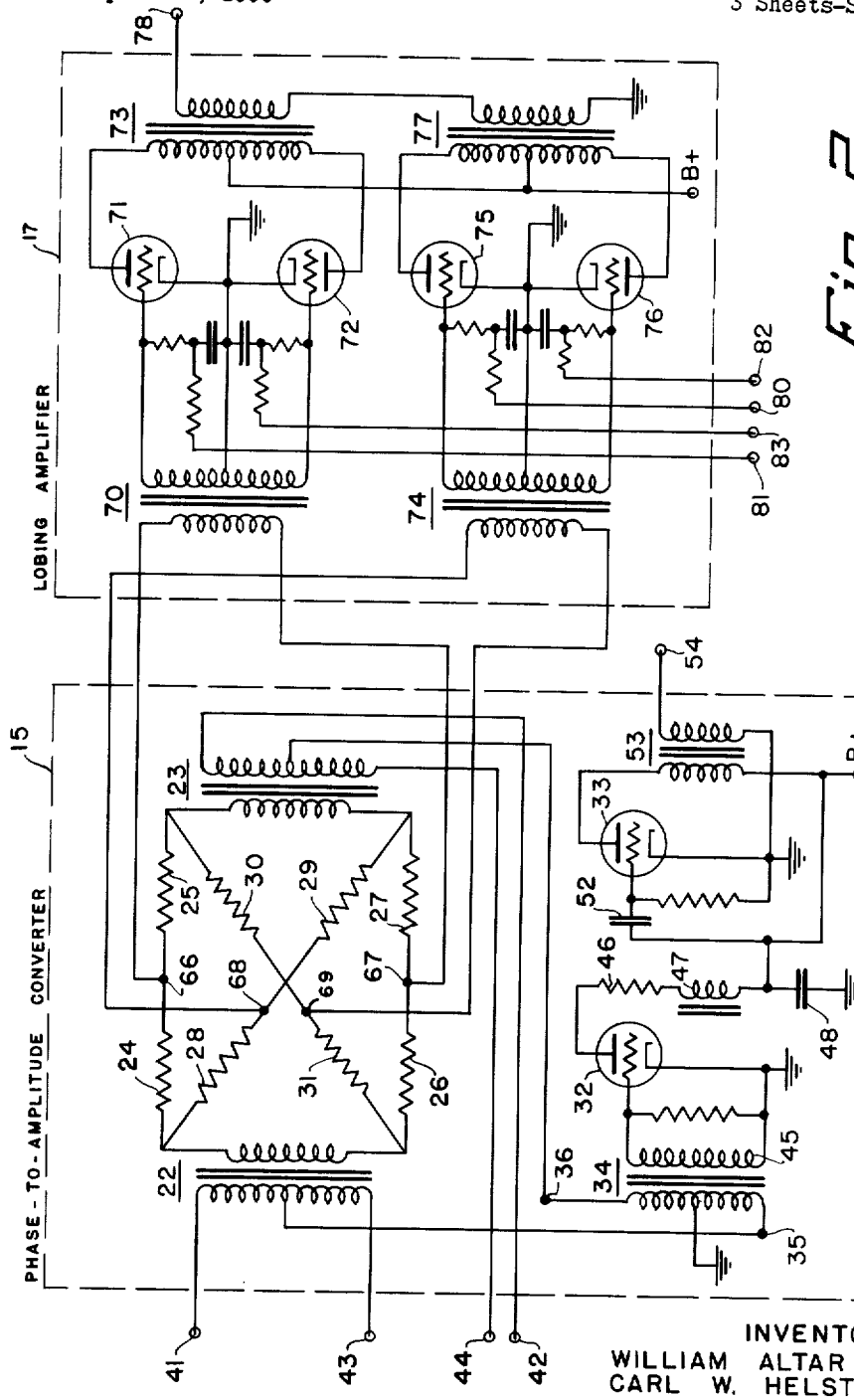
FIG. 2 is a schematic circuit diagram detailing the circuit units which provide signals for sum- and difference-signal channels.

FIG. 3 is a schematic diagram which details the circuitry and relationship of the lobing generator, phase comparator and steering control relays forming part of the system illustrated in FIG. 1; and FIG. 4 illustrates a self-propelled torpedo in which target direction signals derived by apparatus and circuitry such as shown in FIGS. 1, 2 and 3 controls steering means of the torpedo to effect homing action toward the target.

As in the copending application entitled "Continuous Wave Acoustic Guidance System," referred to above, the system to be described is intended for use in a substantially constant-speed active-acoustic-homing torpedo having means for projecting an unmodulated continuous-wave acoustic search signal, and means for receiving corresponding echo-signals in a relatively narrow beam directed along the longitudinal axis of the torpedo. The torpedo is initially automatically controlled to follow a prescribed search course until a moving-target echo is detected, at which time the torpedo is automatically controlled, in accordance with target location and steering information as derived by means to be described, to home upon the target source of echoes. However, the means for obtaining initial search control of torpedo steering and switching therefrom to homing control forms no part of the present invention, and the following description is therefore primarily concerned with the novel combination and circuitry employed for target-echo acquisition and homing control of the torpedo.

Referring now to the drawing, in which like parts are designated by the same reference numerals throughout the figures, FIG. 1 illustrates in block diagram form a preferred embodiment of the improved underwater acoustic target detection, location and steering control system, intended for use in a homing torpedo as above described and as indicated in FIG. 4, in accordance with the present invention. Receiving transducer 10, which may be of magnetostrictive type and mounted in the nose of the torpedo, comprises four sections or quadrants 11, 12, 13 and 14 which individually translate impinging acoustic energy into corresponding electrical signals, these signals having the same frequencies as the impinging acoustic energy, and differing from each other as to phase in accordance with the direction of the echo source of the impinging acoustic energy. In a typical embodiment, the acoustic energy projected by the torpedo has a fixed ultrasonic frequency $F_0$ of say 60 kc./s. (kilocycles per second). The receiving transducer 10 is correspondingly designed to operate at or near this frequency $F_0$, and the response characteristic of the transducer is inherently broad enough to accommodate such variations in frequency of returned ultrasonic energy as will arise because of Doppler-shift due to relative velocity of the torpedo. Each section of transducer 10 will deliver electrical signals having several components, a so-called leak-through component at the frequency $F_0$ due to a transmitter cross-talk effect, a reverberation component having a substantially fixed Doppler-shift frequency $F_1$ greater than $F_0$ due to the closing velocity of the torpedo relative to various discontinuities and immobile particles in the sea-water which give rise to reverberation signals, and a target-signal component having a Doppler-shift frequency $F_2$ which may vary and be either less than or greater than $F_1$ dependent upon the velocity of the moving target relative to the torpedo. It is to be understood that the leak-through and reverberation signals are present at all times and that the target signal is present only while the target is substantially within the confines of the search beam pattern and detection range of the torpedo.

The target-signals delivered by the several sections of transducer 10 will have substantially equal amplitudes but relative phase characteristics which, for a given transducer and given operating frequency, will vary in accordance with the direction from which the impinging energy arrives, relative to the transducer's axis of symmetry which may be regarded as substantially coinciding with the longitudinal axis of the torpedo. As in the system described in the previously mentioned copending application, the four sections of transducer 10 have a common ground (not shown) and are so connected that, for a straight-ahead target, sections 11 and 13 will deliver equi-phased target-signals which are in phase opposition relative to the equi-phased target-signals delivered by sections 12 and 14. This condition is designated by the relative polarity markings applied to the four sections of transducer 10 in FIG. 1. The transducer sections are connected and phased as described in order that the phase-to-amplitude converter 15, to which their target-signals are applied, will deliver a suitable sum-signal and difference-signals for proper operation of the system here described.

The four target-signals delivered by transducer 10 to phase-to-amplitude converter 15 are transformed therein, without change as to frequency (but with quadrature phase shift) to so-called difference-signals having relative amplitude characteristics substantially corresponding to target bearing and elevation relative to the torpedo. The latter signals are applied to a difference-signal channel 16 having a lobing amplifier 17 which, under control of a lobing generator and as later detailed, converts the difference-signals into a single amplitude-modulated signal, hereinafter termed the AM signal, the modulation envelope having phase and amplitude characteristics which also define the relative target direction, now in terms of its orientation angle about the torpedo axis and its angular deviation from the torpedo axis, respectively. Because of the lobing amplifier technique which provides target direction information in a single signal, rather than in a set of difference-signals, a single channel can be employed to operate upon the AM signal, again affording a significant saving in equipment. Phase-to-amplitude converter 15 also delivers, without change as to frequency, a sum-signal which is utilized in a sum-signal channel 18 having frequency spectrum search and automatic tuning functions as later detailed.

FIG. 2 illustrates schematically a typical phase-to-amplitude converter circuit which may be employed to provide the sum-signal and difference-signals as referred to above. This converter comprises two input transformers 22 and 23 having center-tapped primaries to which the target-signals delivered by the transducer sections are applied, a bridge circuit formed by eight resistors 24 to 31, inclusive, connected between the secondaries of transformers 22 and 23, and a two-stage amplifier including triodes 32 and 33 and an input transformer 34 having primary terminals 35 and 36 connected to the primary center-taps of transformers 22 and 23, respectively. The primary of transformer 34 is also center-tapped, this center-tap being grounded and thus completing the sum-signal input circuit through the common ground (not shown) of the transducer sections 11, 12, 13 and 14 which connect to primary terminals 41, 42, 43 and 44, respectively, of input transformers 22 and 23.

Designating the four target signals delivered to terminals 41, 42, 43 and 44 as vectors $a$, $-b$, $c$ and $-d$, respectively, to indicate their relative phase relationship for a straight-ahead target, then the signal voltage developed across secondary 45 of transformer 34, as a result of the above-recited circuitry, corresponds to the vector summation $a+b+c+d$. The two-stage amplifier to which this signal voltage is applied includes a phase-shifting network as shown, comprising resistor 46, inductor 47 and capacitor 48, serially connected in that order from the plate element of triode 32 to ground. The signal voltage developed across capacitor 48 is applied to the control grid of succeeding triode 33 through coupling capacitor 52, and output transformer 53 delivers to output terminal 54, and thence to the sum-signal channel 18 as indicated in FIG. 1, an amplified and phase-shifted sum-signal which is substantially in phase-quadrature to the sum-signal represented by the vector summation $a+b+c+d$. The quadrature phase shift is imparted to the sum-signal in order that it may later (at intermediate-frequency) be properly combined (as to phase) with the AM signal delivered by the difference-signal channel 16 (at the same intermediate frequency), as indicated in FIG. 1. The amplified and phase-shifted sum-signal will hereinafter be referred to simply as the sum-signal.

Again referring to FIG. 1, channel 18 to which the sum-signal is applied includes a set of rejection filters, here shown as a combined unit 55, which is designed to greately attenuate the transmission of the leak-through and reverberation components at frequencies $F_0$ and $F_1$, respectively, which are found in the signal applied to the said unit. Thus, the moving-target component, at unknown frequency $F_2$, is filtered or isolated from the other components and passed to mixer 56. In mixer 56, to which the output signal of a suitable local oscillator 57 is also applied, the filtered sum-signal is heterodyned to an intermediate frequency, and the resultant intermediate-frequency signal, hereinafter termed the heterodyned or I-F sum signal, is applied to narrow-band amplifier 58 which in this instance may be designed to have a center frequency of say 12 kc./s.

During both the target search and homing phases of the acoustic torpedo operation, the Doppler-shifted frequency $F_2$ of the moving-target signal, and correspondingly the frequency $F_2$ of the sum-signal passed to mixer 56, will vary in accordance with the target velocity relative to the torpedo. For a typical torpedo speed and a stationary target, and a search signal frequency $F_0$ of 60 kc./s., frequency $F_2$ would be about 61.5 kc./s. and would be rejected along with the reverberation signal at frequency $F_1$ also equal to 61.5 kc./s. For typical moving-target velocities, the frequency $F_2$ may lie anywhere within a frequency spectrum having a band-width about 5 percent of the transmission frequency $F_0$, in this instance therefore amounting to about 3 kc./s. in band-width, or 1.5 kc./s. each side of the 61.5 kc./s. center-frequency, thus within the limits 60 to 63 kc./s. Local oscillator 57 may therefore be designed to provide a variable-frequency heterodyning signal, linearly controllable in frequency between say just under 72 and just over 75 kc./s. by means of oscillator frequency control unit 59 in accordance with the magnitude of a control voltage applied thereto. This frequency control voltage is supplied to oscillator frequency control unit 59 from sweep-voltage source 60 during the target search phase; or, during the target homing phase, from discriminator 61 in an AFC (automatic frequency control) loop including mixer 56, as shown. This selection is accomplished by means of a relay control unit 62 which, when energized by an I-F sum-signal of suitable magnitude delivered by I-F amplifier 58, operates ganged relay switches 63, 64. During the target search phase, and in the absence of target signals of sufficient magnitude, relay control unit 62 is un-energized and switches 63 and 64 are correspondingly in the condition shown by the full-line positions of their switch arms. When relay control 62 becomes energized because of acquisition of a target, and switches 63 and 64 are correspondingly thrown to the condition shown by the dotted line positions of their switch arms, the target homing phase is initiated.

In the search phase, then, during which the torpedo follows a prescribed course in search of a target submarine, relay control unit 62 is un-energized in the absence of target-echo signals, relay switch 63 therefore conducts the variable voltage output of sweep-voltage source 60 to oscillator frequency control unit 59, and local oscillator 57 correspondingly supplies to mixer 56 a heterodyning signal which, in this instance, ranges between about 72 and 75 kc./s. The sweep-voltage source 60 is preferably designed to provide a frequency-control voltage having a saw-tooth waveform, and a cyclic period short enough to permit complete frequency-sweeping action in the interval $\tau$ during which echo-signals can be received from a given target, within the limitations imposed by narrow beam width of the transducer and systematic continual course changes of the torpedo in the search phase. At the same time, the frequency sweep rate effected by the saw-tooth voltage is preferably made low in order not to require too great a bandwidth for I-F amplifier 58, and for this reason the cyclic period of the saw-tooth voltage developed by sweep-voltage unit 60 should be made little shorter than is compatible with the interval $\tau$. In order to provide good selectivity while still maintaining maximum peak response to the I-F sum-signal delivered by mixer 56 during the frequency-sweeping action, I-F amplifier 58 may be designed to have a bandwidth of the order of $\sqrt{df/dt}$ cycles per second, where $df/dt$ (in cycles per second) designates the rate of frequency variation of the heterodyning signal supplied by local oscillator 57.

When target echoes are encountered by transducer 10, and a sum-signal at unknown frequency $F_2$ is correspondingly passed by filter unit 55 to mixer 56, then, at some time during the cyclic period of the frequency-swept local oscillator output, the signal delivered by mixer 56 will be of suitable intermediate-frequency for acceptance and amplification by narrow-band I-F amplifier 58. At this same time, provided the input ultrasonic energy is of sufficient amplitude at frequency $F_2$, the output signal of I-F amplifier 58 triggers relay control unit 62 and thus causes ganged relay switches 63 and 64 to be thrown to the lock-up and homing phase condition corresponding to the dotted positions of the relay switch arms illustrated in FIG. 1. At this time, then, control of local oscillator 57 is transferred from sweep voltage source 60 to the AFC circuit including oscillator frequency control unit 59 and discriminator 61, which automatically adjust the frequency of local oscillator 57 within the range 72 to 75 kc./s. to whatever value is necessary to maintain the resultant heterodyned sum-signal at a frequency substantially equal to the center-frequency of narrow-band I-F amplifier 58. The torpedo will remain in the homing phase so long as suitable target-echo signals are received.

The actions in sum-signal channel 18 as above described constitute signal spectrum search during the target-search phase, automatic lock-up when a suitable target signal $F_2$ is encountered, and automatic tuning during the target-homing phase. In the latter phase, the heterodyned sum-signal output of I-F amplifier 58 is applied by relay switch 64 to narrow-band filter 65 which can be made extremely selective since it need pass only the intrinsic signal bandwidth, filter 65 functioning to provide a substantially noise-free I-F sum-signal, for summation with the output of difference-signal channel 16 as is necessary for derivation of steering control signals.

Returning to consideration of the difference-signal channel and to the character of the signals supplied thereto, and first referring to the phase-to-amplitude converter 15 as detailed in FIG. 2, it will be recalled that the signals $a$, $-b$, $c$ and $-d$ applied as previously indicated to input terminals 41, 42, 43 and 44 have substantially equal magnitudes, but relative phases dependent upon the sense and magnitude of target deviation from a dead-ahead direction. The resultant voltages between bridge junctions 66 and 67, and between bridge junctions 68 and 69, correspond to the vectorial expressions $(a+b)-(c+d)$ and $(a+d)-(b+c)$, respectively, previously and hereinafter referred to as difference-signals because of the subtractive signs in the preceding expressions. As previously mentioned, also, the difference-signals $(a+b)-(c+d)$ and $(a+d)-(b+c)$ have voltage magnitudes corresponding to the elevation and bearing, respectively, of the target relative to normally vertical and horizontal reference planes through the torpedo's longitudinal axis, these magnitudes becoming equal and a minimum when the target is in the dead-ahead direction.

Referring now to the difference-signal channel which is shown in entirety in block diagram form in FIG. 1, lobing amplifier 17 therein may have the circuitry shown schematically in FIG. 2, the difference signals being applied from the phase-to-amplitude converter to the primaries of lobing amplifier input transformers as indicated. The switching or lobing action of amplifier 17 is effected by applying thereto gain-modulating control voltages supplied by a lobing-signal generator which may take the rotating sine-cosine card form shown in FIG. 3, to which further reference will later be made. The lobing amplifier, so termed because it functions to produce an output signal which is similar to that which would result from a beam-pattern lobe-switching technique often employed in radar work, may be regarded as comprising bearing and elevation channels, the combined output signal therefrom being termed the AM signal because of the characteristic modulation imposed by the sequential switching or sampling action of the lobing amplifier. The elevation channel includes an input transformer 70 having a center-tapped secondary, a pair of vacuum-tube triodes 71 and 72, and an output transformer 73 having a center-tapped primary, connected as shown. The bearing channel is of like circuitry, including an input transformer 74 having a center-tapped secondary, a pair of vacuum-tube triodes 75 and 76, and an output transformer 77 having a center-tapped primary, connected in like manner. The primary windings of input transformers 70 and 74 are connected to bridge junctions 66–69 of phase-to-amplitude converter 15, and the secondary windings of output transformers 73 and 77 are serially connected between the common ground and combined-output terminal 78, as shown. The coupling networks to the grid-cathode circuits may be conventional as indicated. While the bearing and elevation circuits of lobing amplifier 17 are each of push-pull configuration per se, as here employed they do not actually function in normal push-pull manner, for the biasing voltages applied to the grid circuits of the lobing amplifier via terminals 80–83, from the correspondingly designated terminals of the lobing generator 84 detailed in FIG. 3, vary sinusoidally at a lobing frequency $\Omega$ and are phase-sequenced in the order 0°, 90°, 180° and 270°, respectively. The gains of the amplifier tubes are correspondingly modulated at the lobing frequency $\Omega$ (which, expressed as an angular or radian frequency, may be of the order of $20\pi$ radians per second in this two-channel system) and in the indicated phase-sequence, and the end effect is to provide at combined output terminal 78 a signal which is amplitude-modulated at the lobing frequency and in which the phase and amplitude of the modulation component correspond, respectively, to the target direction in terms of its orientation angle about the torpedo axis and its angular deviation from the torpedo axis.

Referring again to the difference-signal channel 16 as shown in FIG. 1, the output AM signal developed at terminal 78 of the lobing amplifier 17 is applied to mixer 85, to which the heterodyning signal from local oscillator 57 is also applied. The automatic frequency control in the lock-up circuit of the sum-signal channel 18 thus also controls the intermediate-frequency of the difference-signal channel, and coherence between the intermediate-frequencies of the signals delivered by the sum-signal channel and the difference-signal channel is continuously maintained. The amplitude-modulated I-F signal delivered by mixer 85 is suitably amplified in selective I-F amplifier 86, characterized by a signal-amplification bandwidth which need be only large enough to accommodate the lobing sidebands.

Phase shifts at intermediate frequency which may be imposed by operations in the difference-signal and sum-signal channels are usually unequal and the resultant phase difference $\delta$, while not ordinarily affecting the sense of steering information, would reduce amplitude of the resultant steering control signals by the factor cos $\delta$. An adjustable phase-shifter 87 may therefore be employed in either channel as necessary, generally in the difference-signal channel as here shown, to effect a compensating phase shift at intermediate-frequency.

The lobing difference-signal channel need not be operative until the lock-up condition in the sum-signal is attained as described (although it should otherwise be in complete readiness for operation), and for this reason the arrangement for switching of the two signal channels into combining relationship, by action of relay control 62, may be modified from that shown in any desired manner.

Mixer and detector unit 88 beats the sharply-tuned I-F sum signal delivered by sum-signal channel 18 with the lobed or AM signal delivered at the same intermediate-frequency by difference-signal channel 16, and provides a demodulated output signal having envelope amplitude variations at the lobing frequency $\Omega$. Amplification and filtering at the lobing frequency is accomplished in filter and driver unit 89, thus supplying a well-isolated modulation signal of suitable magnitude to phase-comparator 90 which in effect functions to extract steering signals therefrom.

It should be noted at this point that sum-signal channel 18 may be regarded as equivalent to a local oscillator of controlled frequency which is synchronized to target-echo fluctuations, delivering a substantially noise-free I-F sum-signal which is then suitably combined with the AM signal supplied by the difference-signal channel. It is this circumstance which enables omission of additional rejection filters in difference-signal channel 16, for reverberation and other spurious components can be strongly attenuated in the output circuits following the I-F signal channels. It is thus an inherent characteristic, of the two-channel system here described, that for a large signal-to-noise ratio of the sum-signal channel as compared to the lobed difference-signal channel, the output signal-to-noise ratio is satisfactorily high and limited principally by the bandwidth of the output circuits.

Lobing generator 84, phase comparator 90 and steering control unit 112, detailed in FIG. 3, are organized and have operating characteristics basically as described in the previously-mentioned copending application. Lobing generator 84 is very suitably supplied as a conventional sine-cosine resistance card device 101, energized through slip-rings (not shown) by a D.-C. voltage B+ applied to terminal 102 relative to the common ground terminal 103. The sine-cosine or lobing generator card 101 is driven in the indicated direction by a geared-down motor (not shown) at suitable speed to develop, at the stationary brushes 104–107 which lead to output terminals 80–83, voltages at the lobing frequency $\Omega$ and having the phase-sequence 0°, 90°, 180° and 270° as already mentioned. Resistive and capacitive elements may be employed as illustrated for voltage filtering and adjustment purposes. An identical sine-cosine resistance card device 108, ganged as shown to card 101 and thus synchronized and referenced thereto, serves as the phase-comparator 90. The output modulation signal delivered by the previously-mentioned filter and driver unit 89 is applied to the phase-comparator 90 through slip-rings (not shown) via terminals 109, 110. As indicated earlier, the phase of the modulation signal corresponds to the target direction in terms of its orientation angle about the torpedo axis, and the modulation signal is therefore of the form sin $(\Omega t+\phi)$, where $\phi$ represents the orientation angle and where both $\phi$ and $\Omega t$ are referred to a normally horizontal reference plane through the torpedo axis. Phase comparator 90 in effect multiples this modulation signal by the factors sin $\Omega t$ and cos $\Omega t$ because of rotation of card 108 at a speed corresponding to the angular frequency $\Omega$, providing at the pair of stationary brushes 114, 116 an output voltage having a D.-C. term proportional to sin $\phi$, and at the pair of stationary brushes 115, 117 an output voltage having a D.-C. term proportional to cos $\phi$, as explained in detail in copending U.S. application Serial No. 451,994, entitled "Phase Comparator," filed August 24, 1954 by Raymond U. Sims and Frederick Leonard and now Patent No. 2,855,566. These phase comparator output D.-C. voltages proportional to sin $\phi$ and cos $\phi$ thus correspond to the target elevation and bearing, respectively, and are applied to the control windings 120, 121 of polarized relays 122, 123 as indicated, to effect steering of the torpedo toward the target. This may be accomplished by utilizing contacts 126–128 of relay 122, and contacts 130–132 of relay 123, to control circuits (not shown) for actuating the elevators and rudders 135 and 136, respectively, of the torpedo 137 shown in FIG. 4, in accordance with the sense of voltages sin $\phi$ and cos $\phi$, respectively, to steer the torpedo in a direction to reduce the magnitude of the said D.-C. voltages applied to the relays. By way of example, the steering control unit 112 and phase comparator 90 may be so connected that for a target submarine lying below and to port, respectively, of normally horizontal and vertical reference planes through the torpedo axis 138, the phase comparator output D.-C. voltages assume negative values; windings 120, 121 of relays 122, 123 may be connected to close contacts 127, 128 and 131, 132 in response to these negative voltages, resulting in down-elevator and port-rudder condition and thus steering the torpedo toward the target. It is found in practice that the described system and steering circuits will respond to target bearing and elevation angles as small as one degree.

Various additions to, or modifications of, the above-described system will occur to those skilled in the art. For example, in embodiments where AGC action may be desired, an uncomplicated conventional AGC circuit may be incorporated in the sum-signal channel. As another example, the sum-signal channel may be modified to include means for compensating for the transit-time misalignment of the transmission and receiving beam patterns, such as disclosed in the copending U.S. application, Serial No. 487,722, filed February 11, 1955 by William L. Altar and Carl W. Helstrom and now Patent No. 3,048,813. For combining the signals delivered by the sum-signal and difference-signal channels and for deriving steering information therefrom, other techniques than the one hereinbefore described may be employed. For example, the I-F sum-signal delivered by mixer 56 may be applied to dual narrow-band amplifiers, modulated in phase-quadrature as to gain by the lobing generator; their modulated output signals may then be combined with the difference-signal channel output, in two mixer-detectors, to provide bearing and elevation D.-C. signals for direct application to the steering control unit.

It should also be expressly understood that while the invention is here illustrated and described with reference to a specific torpedo embodiment, wherein noise-free steering control signals are derived in novel manner and applied to effect guidance of the torpedo toward a target submarine, it is also applicable in principle to other types of torpedoes, and to direction finding equipment in general.

Obviously other modifications, variations and applications of the present invention are possible in the light of the above teachings. It is therefore to be understood that within the scope of the appended claims the invention may be practiced otherwise than as specifically described herein.

What is claimed is:

1. A target location system, comprising electro-acoustic echo-ranging means for providing a first signal indicating target presence and a second signal of like frequency having modulation characteristics dependent upon target direction, first and second signal channels for operating upon said first and second signals, respectively, said first signal channel including means for eliminating noise components from said first signal, means controlled by the substantially noise-free first signal to heterodyne the latter signal and said second signal to a substantially fixed intermediate frequency in said first and second channels, respectively, and means for combining intermediate-frequency output signals of said channels and for deriving therefrom control signals corresponding to target direction.

2. A target location system, comprising means for providing a first signal indicating target presence and a second signal of like frequency having characteristics dependent upon target direction, first and second signal channels, variable tuning means for said channels, said first signal channel having high selectivity compared to that of said second signal channel, said first signal channel adapted to effect automatic control of said tuning means to maintain a coherently tuned condition of said channels, and means for combining output signals of said channels and for deriving therefrom control signals corresponding to target direction.

3. A target location system, comprising transducer means for receiving wave energy from a target and for providing therefrom target signals having relative phase characteristics corresponding to target-direction deviations relative to a reference axis and a reference plane therethrough extending from said transducer means, converter means adapted to combine said target signals and to provide therefrom vectorial-sum and vectorial-difference signals having like carrier-frequency, said vectorial-difference signals being characterized by magnitudes corresponding to said target-direction deviations, distinct sum-signal and difference-signal channels, means for heterodyning said sum and difference signals in each of said channels to provide output sum and difference signals, respectively, at intermediate frequency, said heterodyning means including a local oscillator, said sum-signal channel including means to effect automatic control of said local oscillator to maintain the intermediate frequency of said output signals at a substantially fixed value, and means for combining said output signals and for deriving therefrom control signals having characteristics corresponding to the sense and magnitude of said target-direction deviations.

4. A target location system comprising: means for providing a lobing reference signal of frequency $\Omega$; means for receiving wave energy from a target and for deriving therefrom first and second signals of like frequency F; said first signal being indicative of the presence of a target; said second signal carrying modulation at frequency $\Omega$, having a modulation amplitude corresponding to target-direction deviation from a reference axis, and a modulation phase, relative to said lobing reference signal, corresponding to orientation of target direction about said reference axis; distinct first and second signal channels; variable tuning means for said channels; said first signal channel adapted to effect highly selective amplification of said first signal and to automatically control said tuning means to maintain a coherently tuned condition of said signal channels; and means for combining said output signals and for deriving therefrom control signals having characteristics corresponding to target-direction deviations from orthogonal reference planes through said reference axis.

5. In combination, a self-propelled torpedo, electro-acoustic echo-ranging means for deriving a first signal indicating target presence and a second signal of like frequency having modulation characteristics dependent upon target direction, first and second signal channels for operating upon said first and second signals, respectively, said first signal channel including means for eliminating noise components from said first signal, means controlled by the substantially noise-free first signal to heterodyne the latter signal and said second signal to a substantially fixed intermediate-frequency in said first and second channels, respectively, means for combining intermediate-frequency output signals of said channels and for deriving therefrom control signals corresponding to target direction, and torpedo steering means utilizing said control signals to effect homing action.

6. In combination, a self-propelled torpedo, means for deriving a first signal indicating target presence and a second signal of like frequency having characteristics dependent upon target direction, first and second signal channels, variable tuning means for said channels, said first signal channel having high selectivity compared to that of said second signal channel, said first signal channel adapted to effect automatic control of said tuning means to maintain a coherently tuned condition of said channels, means for combining output signals of said channels and for deriving therefrom control signals corresponding to target direction, and torpedo steering means utilizing said control signals to effect homing action.

7. In combination, a self-propelled torpedo, transducer means for receiving wave energy from a target and for providing therefrom target signals having relative phase characteristics corresponding to target-direction deviations relative to a reference axis and a reference plane therethrough extending from said transducer means, converter means adapted to combine said target signals and to provide therefrom vectorial-sum and vectorial-difference signals having like carrier frequency, said vectorial-difference signals being characterized by magnitudes corresponding to said target-direction deviations, distinct sum-signal and difference-signal channels, means for heterodyning said sum in each of said channels difference signals and to provide output sum and difference signals, respectively, at intermediate frequency, said heterodyning means including a local oscillator, said sum-signal channel including means to effect automatic control of said local oscillator to maintain the intermediate-frequency of said output signals at a substantially fixed value, means for combining said output signals and for deriving therefrom control signals having characteristics corresponding to the sense and magnitude of said target-direction deviations, and torpedo steering means utilizing said control signals to effect homing action.

8. In combination: a self-propelled torpedo; means for providing a lobing reference signal of frequency $\Omega$; means for receiving wave energy from a target and for deriving therefrom first and second signals of like frequency F; said first signal being indicative of the presence of a target; said second signal carrying modulation at frequency $\Omega$, having a modulation amplitude corresponding to target-direction deviation from a reference axis, and a modulation phase, relative to said lobing reference signal, corresponding to orientation of target direction about said reference axis; distinct first and second signal channels; variable tuning means for said channels; said first signal channel adapted to effect highly selective amplification of said first signal and to automatically control said tuning means to maintain a coherently tuned condition of said signal channels; means for combining said output signals and for deriving therefrom control signals having characteristics corresponding to target-direction deviations from orthogonal reference planes through said reference axis; and torpedo steering means utilizing said control signals to effect homing action.

References Cited by the Examiner

UNITED STATES PATENTS 2,631,279   3/1953   Bollinger _____ 343—16

BENJAMIN A. BORCHELT, *Primary Examiner.*

CHESTER L. JUSTUS, NORMAN H. EVANS,
*Examiners.*